US006431804B1

(12) United States Patent
Wetzig, III

(10) Patent No.: US 6,431,804 B1
(45) Date of Patent: Aug. 13, 2002

(54) ENDGATE

(76) Inventor: John M. Wetzig, III, 2580 University Blvd., University Heights, OH (US) 44118

( * ) Notice: Subject to any disclaimer, the term of this patent is extended or adjusted under 35 U.S.C. 154(b) by 0 days.

(21) Appl. No.: 09/345,554

(22) Filed: Jun. 30, 1999

(51) Int. Cl.[7] .............................. B60P 1/64; B63B 25/00
(52) U.S. Cl. ......................................... 410/94; 410/121
(58) Field of Search ............................. 410/94, 95, 32, 410/42, 47, 153, 121, 129; 248/351, 346.02, 165, 166

(56) References Cited

U.S. PATENT DOCUMENTS

| | | | | |
|---|---|---|---|---|
| 1,088,347 A | * | 2/1914 | Koehler | |
| 1,570,020 A | * | 1/1926 | Welsh | |
| 2,424,070 A | * | 7/1947 | Welsh | |
| 3,193,122 A | * | 7/1965 | Sauthoff | |
| 3,637,094 A | * | 1/1972 | Grey | |
| 4,338,053 A | * | 7/1982 | Abel | |
| 4,498,824 A | | 2/1985 | Kinkle | 410/121 |
| 4,695,211 A | * | 9/1987 | Van Iperen et al. | |
| 4,743,151 A | * | 5/1988 | Haberkorn | |
| 4,770,579 A | | 9/1988 | Aksamit | 410/150 |
| 5,374,464 A | | 12/1994 | Jacobsen et al. | 428/100 |
| 5,690,305 A | * | 11/1997 | Perkins | |
| 5,741,039 A | * | 4/1998 | Habdas | |
| 5,800,145 A | | 9/1998 | Kelce | 410/142 |
| 5,918,925 A | * | 7/1999 | Perrin | |
| 5,950,392 A | * | 9/1999 | Short et al. | |

FOREIGN PATENT DOCUMENTS

DE    291-298 A  *  6/1991

* cited by examiner

*Primary Examiner*—Stephen T. Gordon
*Assistant Examiner*—Scott Carpenter
(74) *Attorney, Agent, or Firm*—Tarolli, Sundheim, Covell, Tummino & Szabo, L.L.P.

(57) ABSTRACT

A preassembled endgate (10) for blocking movement of a load (12) along the floor (30) of a vehicle (14) includes a floor panel (40) adapted to extend along the vehicle floor, and a load panel (90) engageable with the load. The endgate (10) also comprises a first hinge (140–142) connected between the load panel (90) and the floor panel (40) to enable the load panel to pivot relative to the floor panel between (a) a stored condition in a side by side relationship with the floor panel and (b) a blocking condition extending upward from and transverse to the floor panel. The endgate (10) also comprises a brace panel (150) extending between and transverse to the load panel (90) and to the floor panel (40) to maintain the load panel in the blocking condition relative to the floor panel.

9 Claims, 4 Drawing Sheets

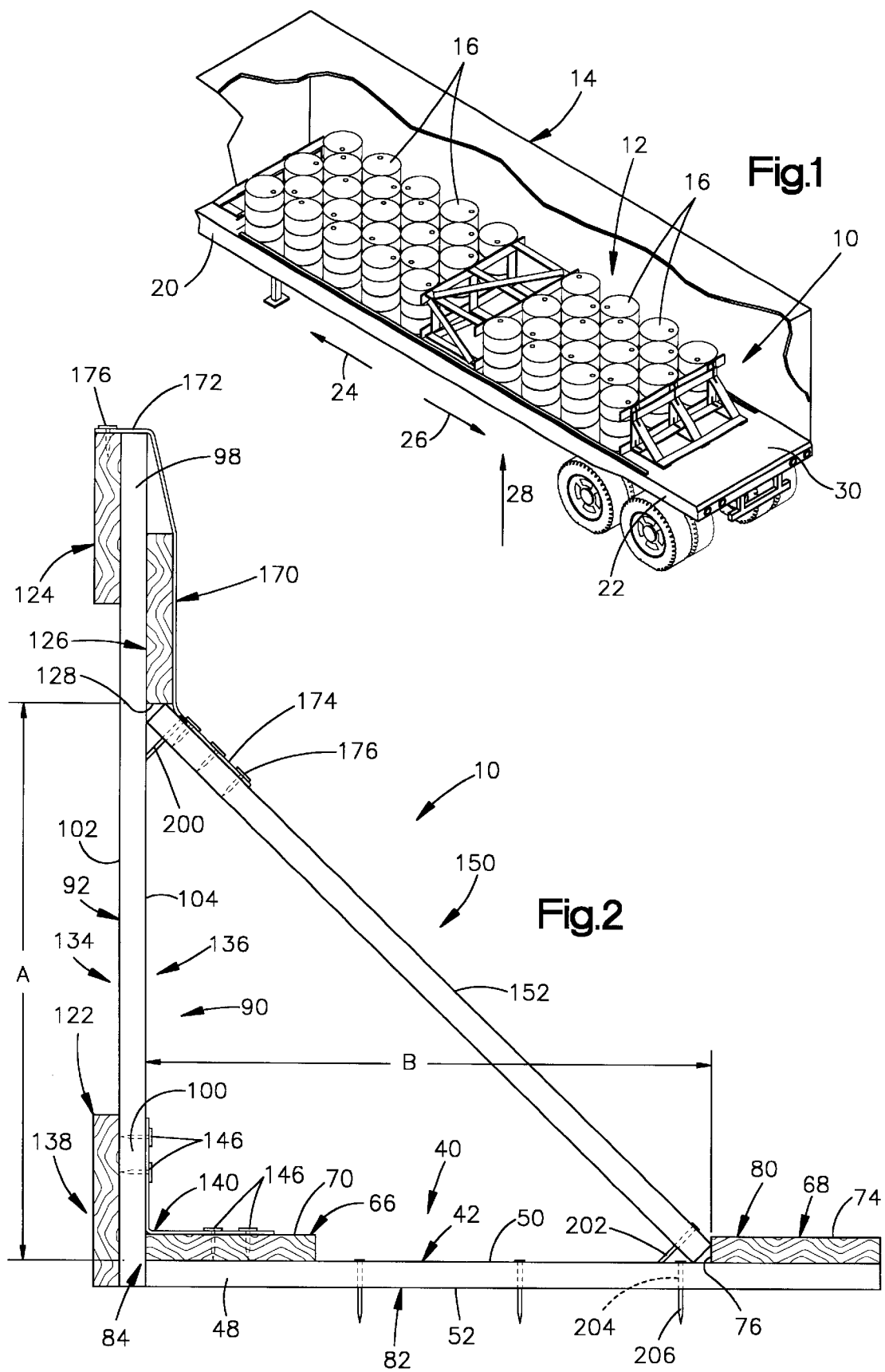

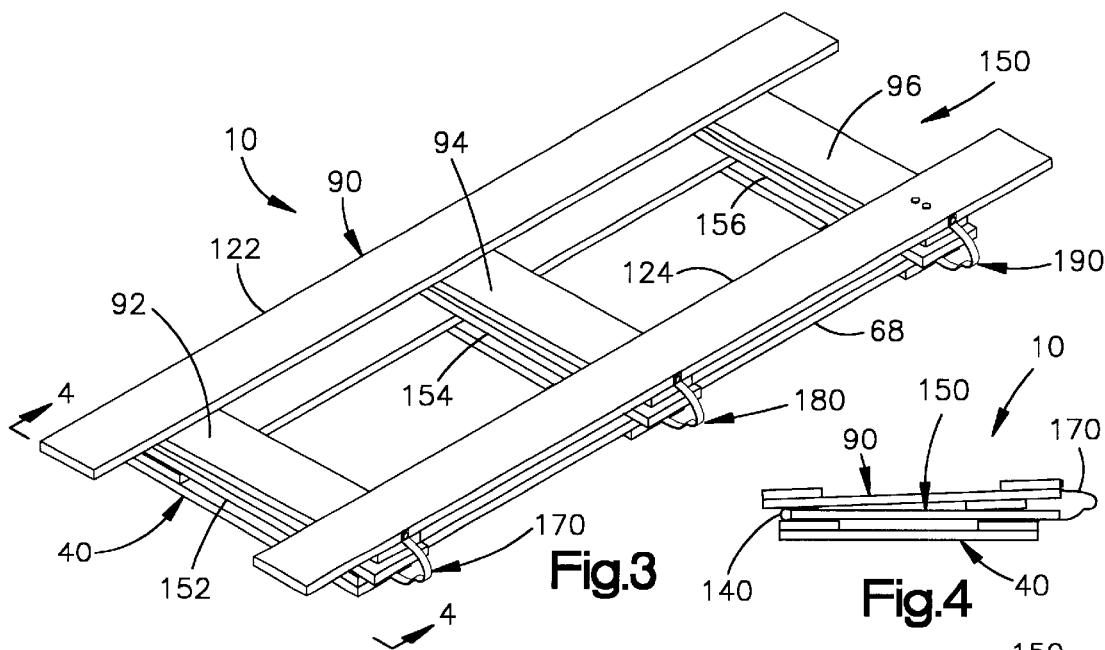
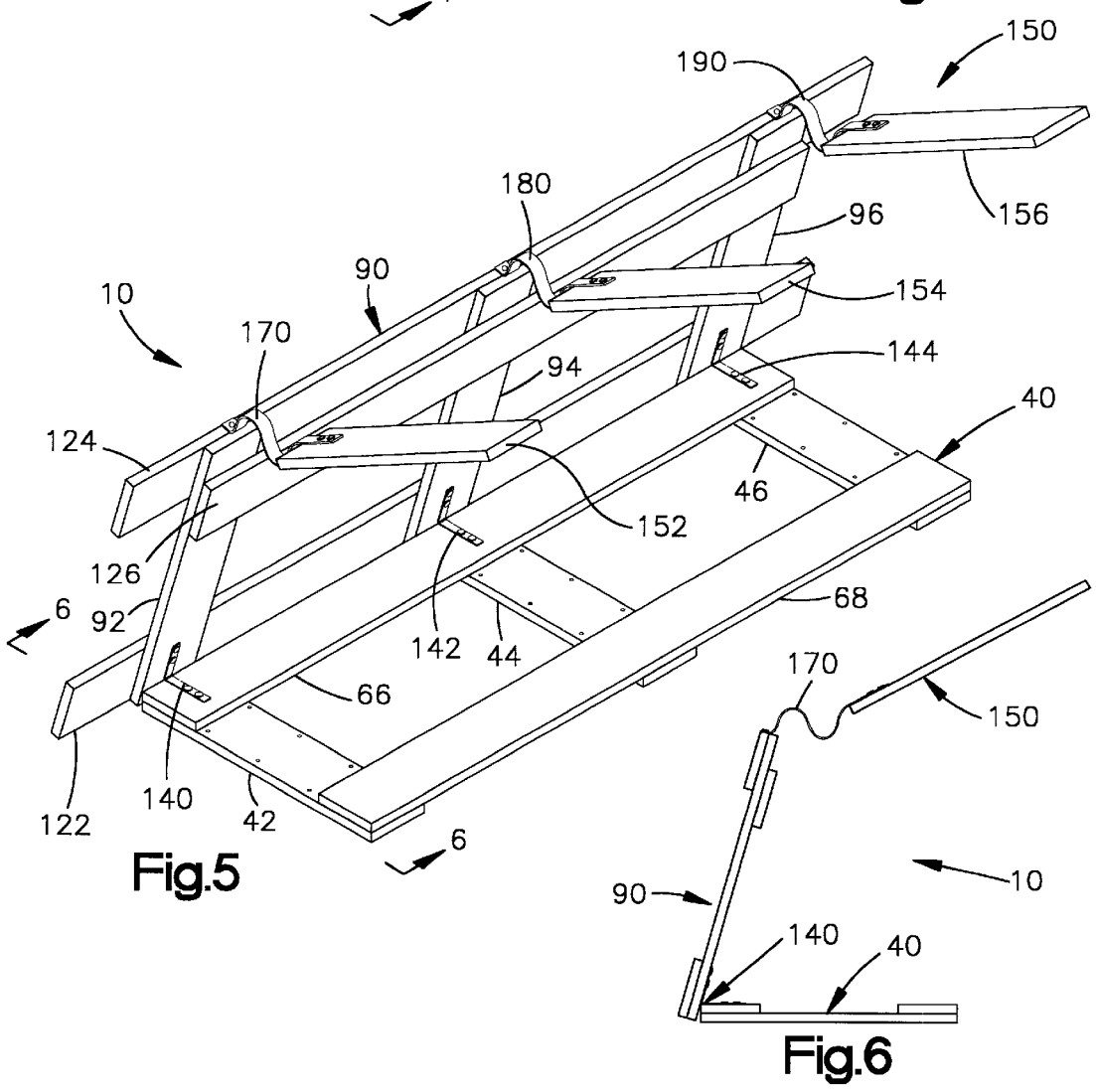

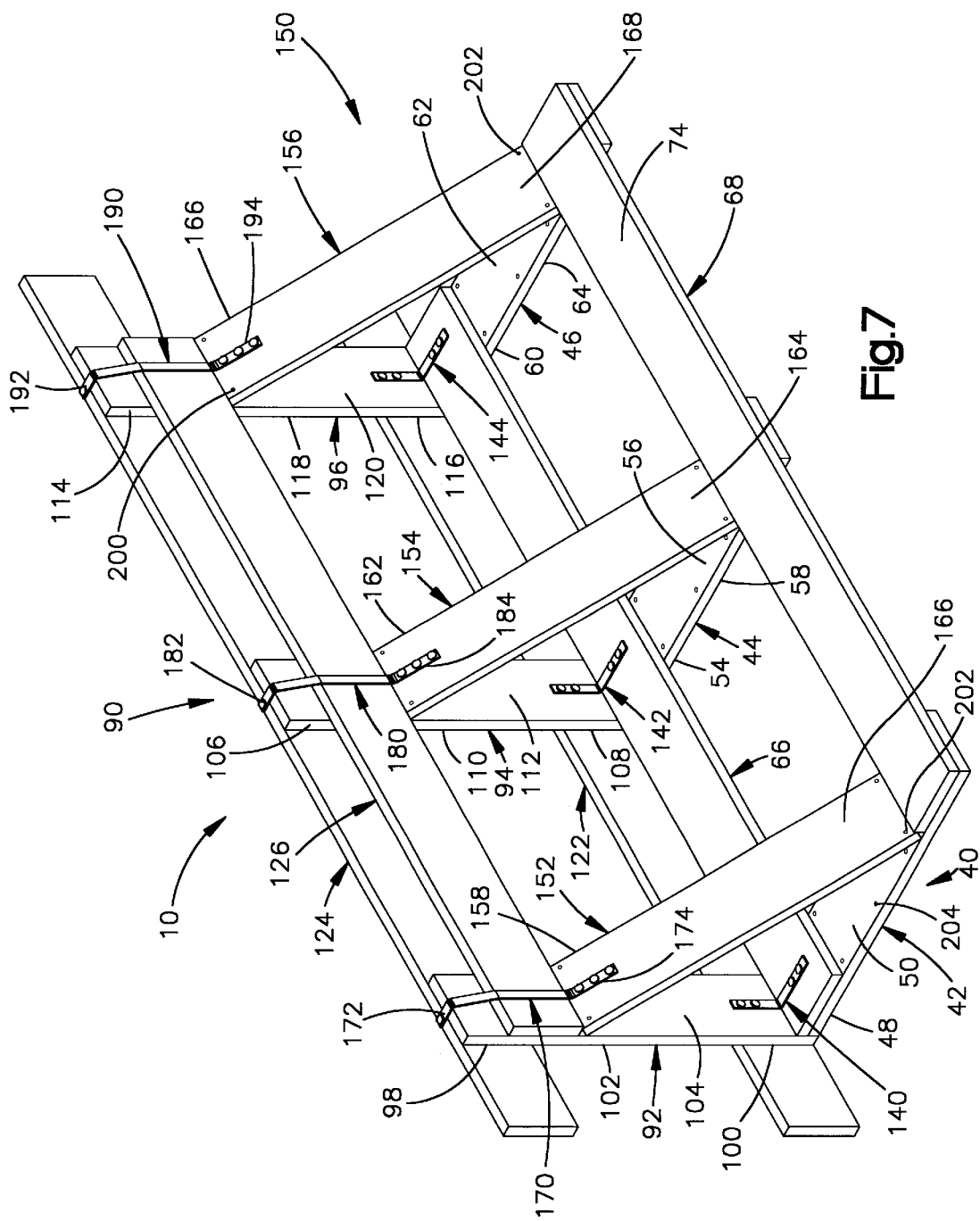

ENDGATE

BACKGROUND OF THE INVENTION

1. Technical Field

The present invention relates to an endgate and, in particular, to an endgate for use in securing a load in position on the floor of a vehicle such as a trailer or of another cargo carrying unit such as a container.

2. Description of the Prior Art

It is often necessary to secure a load in position on the floor of a vehicle such as a trailer or a container. Typically this securing is done with a device called an endgate. The endgate is secured to a portion of the vehicle, such as the vehicle floor or side walls, in a position to block movement of the load along the floor of the vehicle.

Often, an endgate is simply stick built on the spot from wood such as 2×6 planks and nailed to the wooden floor of the trailer. This construction operation takes time and produces a device which is not readily reusable. Various types of endgates have been invented to address this problem, but none has met with industry acceptance.

SUMMARY OF THE INVENTION

The present invention is a preassembled endgate for blocking movement of a load along the floor of a vehicle. The endgate comprises a floor panel adapted to extend along the vehicle floor, and a load panel engageable with the load. The endgate also comprises a first hinge connected between the load panel and the floor panel to enable the load panel to pivot relative to the floor panel between (a) a stored condition in a side by side relationship with the floor panel and (b) a blocking condition extending upward from and transverse to the floor panel. The endgate also comprises a brace panel extending between and transverse to the load panel and to the floor panel to maintain the load panel in the blocking condition relative to the floor panel.

The present invention is also a method of erecting a preassembled endgate to block movement of a load along the floor of a vehicle. The method comprises the steps of:

providing a preassembled endgate including a floor panel, a load panel, and a brace in a stored condition in which the load panel and the floor panel and the brace panel are interconnected by hinges and are disposed in a side by side relationship with each other;

placing the preassembled endgate in the vehicle with the end gate in the stored condition;

moving the load panel relative to the floor panel to a blocking position extending transverse to the floor panel; and moving the brace to a bracing position extending transverse to the load panel and the floor panel;

the step of moving the load panel relative to the floor panel including pivoting the load panel relative to the floor panel about a hinge that interconnects the load panel and the floor panel;

the step of moving the brace panel to a bracing position including pivoting the brace panel relative to one of the load and floor panels about a hinge that interconnects the brace and the one of the load and floor panels.

BRIEF DESCRIPTION OF THE DRAWINGS

The foregoing and other features of the present invention will become apparent to one of ordinary skill in the art to which the present invention relates upon consideration of the following description of the invention with reference to the accompanying drawings, wherein:

FIG. 1 is a cutaway view of a trailer carrying a load and having an endgate in accordance with the invention in blocking condition securing the load;

FIG. 2 is a side view, partially in section, of the endgate of FIG. 1 shown in the blocking condition;

FIG. 3 is a perspective view of the endgate of FIG. 1 shown in a stored condition;

FIG. 4 is an end view of the endgate in the stored condition taken generally along line 4—4 of FIG. 3;

FIG. 5 is a perspective view showing the endgate in an intermediate condition being moved from the stored condition of FIGS. 3 and 4 to the blocking condition of FIGS. 1 and 2;

FIG. 6 is an end view of the endgate in the intermediate condition taken generally along line 6—6 of FIG. 5; and FIG. 7 is a perspective view showing the endgate in the blocking condition.

DESCRIPTION OF A PREFERRED EMBODIMENT

Figure 4A:
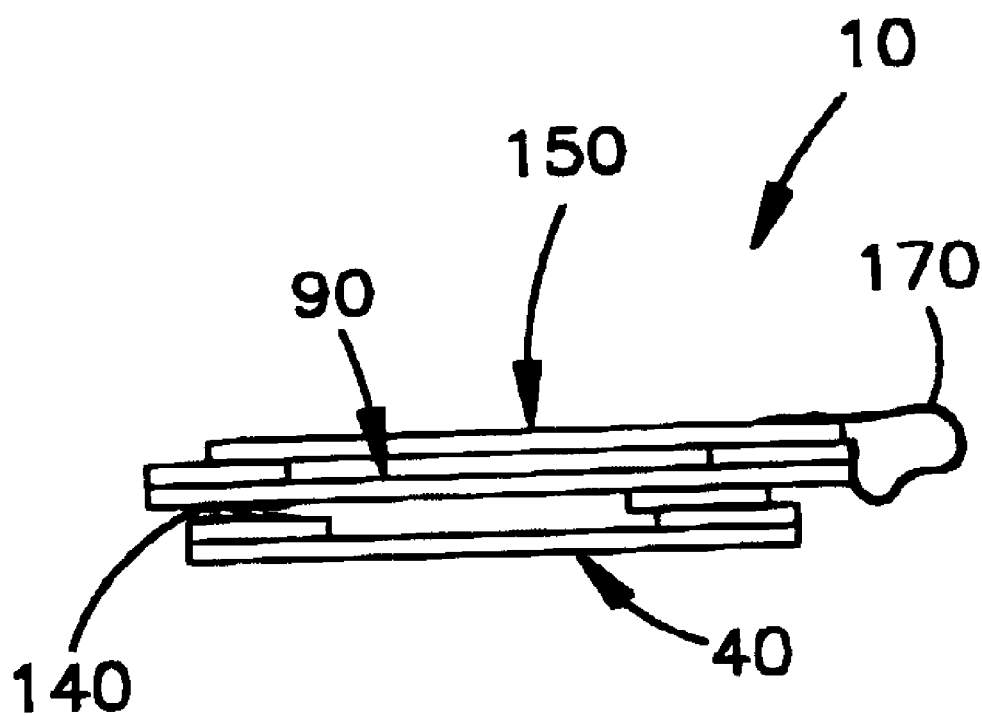
FIG. 4A is a view similar to FIG. 4 and showing the endgate in an alternative stored condition.

The present invention relates to an endgate and, in particular, to an endgate for use in securing a load in position on the floor of a device such as a trailer or container. The present invention is applicable to various endgate constructions. As representative of the present invention, FIG. 1 illustrates an endgate 10 for use in securing a load 12 in a vehicle 14.

The load 12 is illustrated as being a plurality of drums 16 such as fifty-five gallon drums. The endgate 10 can be used for securing other types of loads in position in the vehicle 14 or any other cargo-carrying device.

The vehicle 14 is a trailer having a front end portion 20 and a back end portion 22. A forward direction in the trailer 14 is indicated by the arrow 24. An opposite rearward direction in the trailer 14 is indicated by the arrow 26. An upward direction in the trailer 14 is indicated by the arrow 28. The trailer 14 has a load floor 30. The load floor 30 extends generally horizontally in the trailer 14. The load floor 30 is made from or has an upper layer of wood or another material suitable for receiving nails.

The endgate 10 includes three major parts: a floor panel 40 for extending horizontally along the vehicle floor 30 and for supporting the endgate in position on the vehicle floor; a load panel 90 for engagement with the load 12; and a brace panel 150 for maintaining the load panel in an upright or blocking position relative to the floor panel.

The floor panel 40 is made from a plurality of pieces of one and one-quarter inch full by five and one-half inch full hardwood lumber, preferably oak. Other materials can alternatively be used, such as lumber of different dimensions or softwood.

The floor panel 40 includes three base (front to back) boards 42, 44 and 46. The base boards 42–46 extend front to back in the trailer 14 when the endgate 10 is positioned as shown in FIG. 1.

The left base board 42 has a forward end portion 48 and upper and lower side surfaces 50 and 52, respectively. The center base board 46 has a forward end portion 54 and upper and lower side surfaces 56 and 58, respectively. The right base board 46 has a forward end portion 60 and upper and lower side surfaces 62 and 64, respectively.

The floor panel 40 also includes two cross (side to side) boards 66 and 68 which interconnect the base boards 42–46. The forward cross board 66 has an upper side surface 70 and a forward side surface not shown. The rear cross board 68 has an upper side surface 74 and a forward side surface 76.

All five boards 42, 44, 46, 66 and 68 of the floor panel 40 are secured together with suitable fasteners (not shown) such as nails or screws and possibly also with gluing. The joined boards 42, 44, 46, 66 and 68 form a rigid, rectangular, generally planar floor panel 40.

The floor panel 40 as thus formed has an upper major side surface 80 which comprises the upper side surfaces 70 and 74 of the two cross boards 66 and 68. The floor panel 40 has a lower major side surface 82 which comprises the lower side surfaces 52, 58 and 64 of the three base boards 42–46, respectively. The three base boards 42–46 are presented downward for contact with the floor 30 of the trailer 14. The floor panel 40 has a forward edge or end portion 84 defined by the forward edge surface not shown of the front cross board 66 and the forward end portions 48, 54 and 60 of the three base boards 42, 44 and 46, respectively.

The load panel 90 is similar in construction to the floor panel 40. The load panel 90 includes three upright boards or uprights 92, 94 and 96. The uprights 92, 94 and 96 typically extend generally vertically when the endgate 10 is in the blocking position shown in FIGS. 1 or 2.

The left upright 92 has opposite upper and lower end portions 98 and 100 and opposite front and rear side surfaces 102 and 104. The center upright 94 has opposite upper and lower end portions 106 and 108 and opposite front and back rear surfaces 110 and 112. The right upright 96 has opposite upper and lower end portions 114 and 116 and opposite front and rear side surfaces 118 and 120.

The load panel 90 also includes three cross (side to side) boards 112, 124 and 126 which join the uprights 92–96. The lower cross board 122 joins the lower end portions 100, 108 and 116 of the three uprights 92–96. The lower cross board 122 extends across the front side surfaces 102, 110 and 118 of the three uprights 92–96. The lower cross board may, but need not, extend past the left and right uprights 92 and 96, as shown in the drawings.

The upper cross board 124 joins the upper end portions 98, 106 and 114 of the three uprights 92–96. The upper cross board 124 extends across the front side surfaces 102, 110 and 118 of the three uprights 92–96. The upper cross board 124 may, but need not, extend past the left and right uprights 92 and 96, as shown in the drawings.

An intermediate cross board 126 extends across the rear side surfaces 104, 112 and 120 of the three uprights 92–96. The intermediate cross board 126 has a lower side surface 128. The intermediate cross board 126 is positioned vertically on the uprights 92–96 in accordance with a predetermined distance "A" as defined below.

All six boards 92–96 and 122–126 of the load panel 90 are secured together with suitable fasteners (not shown) such as nails or screws and possibly also with gluing. The joined boards form a rigid, rectangular, generally planar load panel 90. The load panel 90 as thus formed has opposite front and rear major side surfaces 134 and 136. The load panel 90 has a lower end portion 138 defined by the lower end portions 100, 108 and 116 of the three uprights 92–96 and by the lower cross board 122.

Three hinges 140, 142 and 144 connect the load panel 90 to the floor panel 40. Each hinge 140–144 is preferably made from a single piece of rubberized nylon strapping, about one inch wide and about one eighth of an inch thick. Other materials can be used for the hinges 140–144, such as one or more pieces of perforated metal strapping.

One end of the left hinge 140 is secured to the lower end portion 100 of the left upright 92 of the load panel 90. The other end of the left hinge 140 is secured to the forward cross board 66 of the floor panel 40.

One end of the center hinge 142 is secured to the lower end portion 108 of the center upright 94 of the load panel 90. The other end of the center hinge 142 is secured to the forward cross board 66 of the floor panel 40.

One end of the right hinge 144 is secured to the lower end portion 116 of the right upright 96 of the load panel 90. The other end of the right hinge 144 is secured to the forward cross board 66 of the floor panel 40.

The hinges 140–144 are secured with suitable fasteners 146, such as roofing nails. The central portions of the hinges 140–144 are preferably not secured, for a reason described below. The hinges 140–144 connect the load panel to the floor panel for relative pivotal movement.

The brace panel 150 includes three identical braces 152, 154 and 156. The left brace 152 has an upper end portion 158 and a lower end portion 160. The center brace 154 has an upper end portion 162 and a lower end portion 164. The right brace 156 has an upper end portion 166 and a lower end portion 168.

A tether 170 connects the left brace 152 to the load panel 90. The tether is preferably made from the same material as the hinges 140–144, that is, a single piece of rubberized nylon strap about one inch wide and about one eighth of an inch thick. The tether 170 could alternatively be made from one or more pieces of perforated metal strapping material or another suitable material.

One end portion 172 of the tether 170 is secured to the top of the load panel 90. The opposite end portion 174 of the tether 170 is secured to the upper end portion 158 of the left brace 152. The tether end portions 172 and 174 are secured with suitable fasteners 176, such as roofing nails. The tether 170 loosely connects the left brace 152 to the load panel 90 for relative movement, both pivotal and otherwise, and thus acts as a hinge also.

The center brace 154 is connected with the load panel in the same manner as the left brace 152, that is, with a tether 180. One end portion 182 of the tether 180 is secured to the top of the load panel 90. The opposite end portion 184 of the tether 180 is secured to the upper end portion 162 of the center brace 154. The tether 180 is secured with suitable fasteners 176, such as roofing nails. The tether 180 loosely connects the center brace 154 to the load panel 90 for relative movement, both pivotal and otherwise, and thus acts as a hinge also.

The right brace 156 is connected with the load panel 90 in the same manner as the left and center braces 152 and 154, that is, with a tether 190. One end portion 192 of the tether 190 is secured to the top of the load panel 90. The opposite end portion 194 of the tether 190 is secured to the upper end portion 166 of the right brace 156. The tether 190 is secured with suitable fasteners 176, such as roofing nails. The tether 190 loosely connects the right brace 156 to the load panel 90 for relative movement, both pivotal and otherwise, and thus acts as a hinge also.

The three major parts of the endgate, that is, the floor panel 40, the load panel 90, and the brace panel 150, are movable between a stored condition as shown in FIGS. 3 and 4 and a blocking condition as shown in FIGS. 1, 2 and 7.

FIGS. 3 and 4 illustrate the stored condition of the endgate 10. The three major parts 40, 90 and 150 extend generally parallel to each other in a side-by-side relationship in overlying engagement. The brace panel 150 (the three braces 152, 154 and 156) is disposed between the floor panel 40 and the load panel 90. (The load panel 90 can alternatively be folded flat on the floor panel 40, with the brace panel 150 flipped up, over, and back down on the load panel.)

The hinges 140–144 that interconnect the floor panel 40 and the load panel 90 are sufficiently long, with their central portions unsecured, to allow the brace panel 150 to fit between the load panel and the floor panel while the load panel and floor panel remain substantially parallel, making a compact, flat package of all three major parts of the endgate 10. The tethers 170, 180 and 190 which interconnect the brace panel 150 and the load panel 90 stick out from one end of the package. The endgate 10 may be secured in the stored condition by known banding or strapping (not shown) which can easily be cut off when the endgate is to be unfolded or opened into its blocking condition.

When the endgate 10 is in the stored condition, it is relatively easily movable, as one piece. For example, the parts of the floor panel 40 are dimensioned and spaced to enable the endgate 10, while in this stored condition, to be lifted by a standard forklift truck and placed on the floor 30 of the trailer 14.

FIGS. 2 and 7 illustrate the assembled or blocking condition of the endgate 10. (FIGS. 5 and 6 illustrate an intermediate condition, in which the endgate 10 is being opened or unfolded.)

To move the endgate 10 from the stored condition to the blocking condition, the floor panel 40 is placed flat, preferably on the floor 30 of the vehicle 14 in which it is to be used. This can be done manually or with a forklift truck.

The load panel 90 is then lifted up. The load panel pivots 90 about the hinges 140–144. The load panel 90 is lifted to the upright position shown in FIGS. 2 and 7.

As the load panel 90 is being lifted, the brace panel 150 comes free from between the load panel and the floor panel 40. The upper end portions 158, 162 and 166 of the three braces 152, 154 and 156, respectively, remain connected with and adjacent the upper end portions 98, 106 and 114 of the three uprights 92–96 of the load panel 90, because of the tethers 170, 180 and 190.

When the load panel 90 reaches the full upright position, the braces 152–156 are then manually positioned between the load panel and the floor panel 40, as shown in FIGS. 2 and 7. Specifically, the upper end portion 158 of the left brace 152 is positioned at the junction of the left upright 92 and the intermediate cross board 126 of the load panel 90. The upper end portion 158 of the left brace 152 engages the back side surface 104 of the left upright 92 and also engages the lower side surface 128 of the intermediate cross board 126. This engagement blocks movement of the left brace 152 in an upward (as viewed in FIGS. 2 and 7) or forward (to the left in FIG. 2) direction.

The lower end portion 160 of the left brace 152 is positioned at the junction of the left base board 42 of the floor panel 40 and the rear cross board 68 of the floor panel. The lower end portion 160 of the left brace 152 engages the upper side surface 50 of the left base board 42 of the floor panel 40 and also engages the forward side surface 76 of the rear cross board 68 of the floor panel. This engagement blocks movement of the left brace 152 in an downward (as viewed in FIGS. 2 and 7) or rearward (to the right as viewed in FIG. 2) direction.

The length of the left brace 152 is selected so that when the left brace is thus securely braced between the load panel 90 and the floor panel 40, the load panel is perpendicular to the floor panel. As a result, when the endgate 10 is positioned in a vehicle such as the vehicle 14 with the floor panel 40 of the endgate generally horizontal, the load panel 90 is generally vertical. The left brace 152 extends between and transverse to the load panel 90 and the floor panel 40 to maintain the load panel in the blocking condition relative to the floor panel.

The center and right braces 154 and 156 are also positioned, in the same manner, between the intermediate cross board 126 of the load panel 90 and the rear cross board 68 of the floor panel 40. The length of the center and right braces 154 and 156 is selected so that when they are securely braced between the load panel 90 and the floor panel 40, the load panel is perpendicular to the floor panel. The center and right braces 154 and 156 extend between and transverse to the load panel 90 and the floor panel 40, to maintain the load panel in the blocking condition relative to the floor panel.

To ensure that the load panel 90 is perpendicular to the floor panel 40 when the braces 152–156 are thus positioned, three particular dimensions of the load panel and floor panel are important.

One of these three dimensions is the dimension marked "A" in FIG. 2. This dimension is the horizontal distance between the rear side surface 104 of the left upright 92 of the load panel 90, and the forward side surface 76 of the rear cross board 68 of the floor panel 40.

Another of these three dimensions is the dimension marked "B" in FIG. 2. This dimension is the vertical distance between the lower side surface 128 on the intermediate cross board 126 of the load panel 90, and the upper side surfaces 50, 56 and 62 of the base boards 42–46, respectively, of the floor panel 40.

The third important dimension is the length of the three braces 152, 154 and 156. When the dimensions "A" and "B" are correct, then braces 152, 154 and 156 of the correct length will, with the load panel 90 and the floor panel 40, form a right triangular (when viewed from the end as in FIG. 2) structure.

The braces 152–156 are then nailed in place to the load panel 90 and to the floor panel 40. Specifically, the upper end portions 158, 162 and 166 of the braces 152–156, respectively, are toe-nailed to the uprights 92–96 of the load panel 90 by nails indicated at 200. The lower end portions 160, 164 and 168 of the braces 152–156 are toe-nailed to the base boards 42–46 of the floor panel 40 by nails indicated at 202. The braces 152–156 are thus secured in position between the load panel 90 and the floor panel 40.

The base boards 42–46 have pre-drilled openings 204. These openings 204 receive fasteners in the form of nails 206 for holding the floor panel 40 in place on the floor 30 of the vehicle 14. A plurality of the nails 206 are used to secure the floor panel 40, and thus the endgate 10, to the floor 30 of the vehicle 14.

The endgate 10, after use, can be removed from the vehicle 14 by removing the nails 206. Then, by removing the toe nails 200 and 202, the endgate 10 can be folded and stored flat for use again.

From the above description of the invention, those skilled in the art will perceive improvements, changes and modifications in the invention. For example, the tethers could connect the brace panel with the rear edge portion of the floor panel, rather than with the upper edge portion of the load panel. Such improvements, changes and modifications within the skill of the art are intended to be covered by the appended claims.

Having described the invention, I claim:

1. A preassembled endgate for blocking movement of a load along a floor of a vehicle, said endgate comprising:

a floor panel adapted to extend along the vehicle floor;

a load panel engageable with the load;

a first hinge connected between an end portion of said load panel and an end portion of said floor panel to enable said load panel to pivot relative to said floor panel between (a) a stored condition in a side by side relationship with said floor panel and (b) a blocking condition extending upward from said end portion of said floor panel with said floor panel extending in only one direction away from said load panel so that the load engages the floor of the vehicle adjacent to said load panel when said load panel is in the blocking condition; and a brace panel extending between and transverse to said load panel and to said floor panel to maintain said load panel in the blocking condition relative to said floor panel;

said load panel having an upper end portion that is spaced from said floor panel when said load panel is in the blocking condition, a first side that faces away from the load and toward said brace panel when said load panel is in the blocking condition, and a second side opposite said first side that faces toward the load and away from said brace panel when said load panel is in the blocking condition;

said endgate including a plurality of tethers extending from said upper end portion of said load panel to an upper end portion of said brace panel to interconnect said brace panel and said load panel;

when said load panel is in the blocking condition said brace panel having a first position engaging said first side of said load panel and extending between and transverse to both said load panel and said floor panel, to maintain said load panel in the blocking condition relative to said floor panel;

said brace panel being movable from the first position over said upper end portion of said load panel to a second position in which said brace panel overlies said second side of said load panel when said load panel is in the stored condition.

2. An endgate as set forth in claim 1 wherein said load panel has an upper end portion which is spaced from said floor panel when said load panel is in the blocking condition and a cross member which extends parallel to said upper end portion of said load panel and has a downwardly facing edge portion, said brace panel having an upper end portion which engages said downwardly facing edge portion of said cross member when said load panel is in the blocking condition, and a plurality of tethers extending from said upper end portion of said load panel, across said cross member, to said upper end portion of said brace panel to interconnect said brace panel and said load panel.

3. An endgate as set forth in claim 1 further including a plurality of fasteners which interconnect said floor panel and the floor of the vehicle to hold said floor panel against movement relative to the floor of the vehicle.

4. An endgate as set forth in claim 1 wherein said first hinge includes a flexible strap having a first end portion fixedly connected to a side of said load panel which faces away from the load and toward said brace panel when said load panel is in the blocking condition and a second end portion fixedly connected with a side of said floor panel which faces upward and extends away from said load panel toward said brace panel when said load panel is in the blocking condition.

5. An endgate a set forth in claim 1 wherein said load panel has a lower end portion which engages the floor of the vehicle when said load panel is in the blocking condition and said floor panel has an end portion which engages a side of said load panel which faces away from the load when said load panel is in the blocking condition.

6. A preassembled endgate for blocking movement of a load along a floor of a vehicle, said endgate comprising:

a floor panel adapted to extend along the vehicle floor;

a load panel engageable with the load;

a flexible hinge connected between said load panel and said floor panel to enable said load panel to pivot relative to said floor panel between (a) a stored condition in a side by side relationship with and spaced apart from said floor panel with a connector portion of said flexible hinge extending across space disposed between said load panel and said floor panel and (b) a blocking condition extending upward from and transverse to said floor panel; and a brace panel extending between and transverse to said load panel and to said floor panel to maintain said load panel in the blocking condition relative to said floor panel;

said connector portion of said flexible hinge having a length which is at least as great as a thickness of said brace panel;

said load panel having an upper end portion that is spaced from said floor panel when said load panel is in the blocking condition, a first side that faces away from the load and toward said brace panel when said load panel is in the blocking condition, and a second side opposite said first side that faces toward the load and away from said brace panel when said load panel is in the blocking condition;

said endgate including a plurality of tethers extending from said upper end portion of said load panel to an upper end portion of said brace panel to interconnect said brace panel and said load panel;

when said load panel is in the blocking condition said brace panel having a first position engaging said first side of said load panel and extending between and transverse to both said load panel and said floor panel, to maintain said load panel in the blocking condition relative to said floor panel;

said brace panel being movable from the first position over said upper end portion of said load panel to a second position in which said brace panel overlies said second side of said load panel when said load panel is in the stored condition.

7. An endgate as set forth in claim 6 wherein said floor panel extends in only one direction away from said load panel when said load panel is in the blocking condition so that the load engages the floor of the vehicle adjacent to said load panel when said load panel is in the blocking condition.

8. An endgate as set forth in claim 6 wherein said flexible hinge includes a first end portion which is fixedly connected in abutting engagement with a side of said load panel which faces away from the load and toward said brace panel when said load panel is in the blocking condition and a second end portion which is fixedly connected in abutting engagement with a side of said floor panel which faces upward and extends away from said load panel toward said brace panel when said load panel is in the blocking condition, said first end portion of said flexible hinge being spaced apart from said second end portion of said flexible hinge by a distance which is a function of the thickness of said brace panel when said load panel is in the stored condition.

9. An endgate assembly for blocking movement of a load along a floor of a vehicle, said endgate assembly comprising a load panel having a first side which faces toward and engages the load and a second side which faces away from the load, said load panel having a lower end portion which engages the floor of the vehicle and an upper end portion which extends parallel to said lower end portion, a floor panel having a downward facing side which engages the floor of the vehicle and an upward facing side, said floor panel having a first end portion which is disposed in abutting engagement with said second side of said load panel, said floor panel having a second end portion which extends parallel to said first end portion, a flexible hinge having a first end portion fixedly connected to and disposed in abutting engagement with said second side of said load panel and a second end portion fixedly connected to and disposed in abutting engagement with said upward facing side of said floor panel, a plurality of fasteners extending between said floor panel and the floor of the vehicle to fixedly connect said floor panel with the floor of the vehicle, a brace panel extending between said second side of said load panel and said upper side of said floor panel, said brace panel having an upper end portion which engages a lower edge portion of a first cross member which is disposed on said second side of said load panel, said lower edge portion of said cross member extends parallel to the upper end portion of said load panel, said brace panel having a lower end portion which engages an edge portion of a second cross member which is disposed on the upper side of said floor panel, said edge portion of said second cross member extends parallel to the second end portion of said floor panel, and a plurality of tethers extending from said upper end portion of said load panel, across said first cross member, to said upper end portion of said brace panel;

said brace panel being movable over said upper end portion of said load panel to a position in which said brace panel overlies said first side of said load panel.

* * * * *